(12) United States Patent
Yip et al.

(10) Patent No.: US 7,395,291 B2
(45) Date of Patent: Jul. 1, 2008

(54) MULTIPLIERLESS CORRELATORS FOR HIPERLAN/2 AND IEEE 802.11A WIRELESS LOCAL AREA NETWORKS

(75) Inventors: Kun Wah Yip, Hong Kong (CN); Yik Chung Wu, Hong Kong (CN); Tung Sang Ng, Hong Kong (CN)

(73) Assignee: The University of Hong Kong (CN)

( * ) Notice: Subject to any disclaimer, the term of this patent is extended or adjusted under 35 U.S.C. 154(b) by 788 days.

(21) Appl. No.: 10/784,820

(22) Filed: Feb. 24, 2004

(65) Prior Publication Data

US 2005/0187996 A1  Aug. 25, 2005

(51) Int. Cl.
*G06F 17/10* (2006.01)
(52) U.S. Cl. ..................................... 708/319
(58) Field of Classification Search .................. 708/319
See application file for complete search history.

(56) References Cited

U.S. PATENT DOCUMENTS

| | | | |
|---|---|---|---|
| 4,775,851 A | 10/1988 | Borth | |
| 4,785,463 A * | 11/1988 | Janc et al. | 375/147 |
| 4,791,597 A | 12/1988 | Miron et al. | |
| 4,893,316 A * | 1/1990 | Janc et al. | 708/300 |
| 5,287,299 A | 2/1994 | Lin | |
| 5,548,541 A * | 8/1996 | Bierman et al. | 708/319 |
| 6,092,093 A * | 7/2000 | Bayha et al. | 708/319 |
| 6,122,654 A * | 9/2000 | Zhou et al. | 708/622 |
| 6,202,074 B1 | 3/2001 | Lipka | |
| 6,901,421 B2 * | 5/2005 | Nielsen et al. | 708/308 |

* cited by examiner

*Primary Examiner*—Tan V. Mai
(74) *Attorney, Agent, or Firm*—Berkeley Law & Technology Group Law

(57) ABSTRACT

A sliding correlator for timing synchronization in HIPERLAN/2 and IEEE 802.11a wireless local area networks by correlating the received signal with a known waveform is disclosed. The disclosed sliding correlator avoids the large number of complex multiplications per second, about 320 million by one estimate, by employing an implementation that avoids multiplication operations while also avoiding complexity. This invention discloses methods and apparatus to implement this correlator, using alternative correlator coefficients well suited for digital implementations, whereby the need to perform multiplication is eliminated.

20 Claims, 3 Drawing Sheets

MULTIPLIERLESS CORRELATORS FOR HIPERLAN/2 AND IEEE 802.11A WIRELESS LOCAL AREA NETWORKS

FIELD OF THE INVENTION

The present invention relates to wireless local area networks (WLANs). In particular, the present invention relates to methods and apparatus for correlating a known waveform with a signal received at a receiver in WLANs based on the HIPERLAN/2 specification or the IEEE 802.11a specification.

BACKGROUND

HIPERLAN/2 and IEEE 802.11a WLANs support packetized data transmission at a high rate up to 54 Mbps. Details of their physical layers can be found in the relevant specifications: ETSI, *ETSI TS* 101 475 V. 1.2.2 (2001-02), 2001; IEEE Computer Society, *IEEE Std* 802.11a-1999, 30 Dec. 1999. In both types of WLANs, orthogonal frequency division multiplexing (OFDM) is used as the modulation technique.

For IEEE 802.11a WLANs, a 16 μs preamble is inserted at the beginning of each data packet. The preamble is divided into two subpreambles. The first one consists of ten identical, short OFDM symbols each having a length of 800 ns. The second one comprises two long OFDM symbols each of length 3.2 μs preceded by a 1.6 μs cyclic prefix. The first subpreamble is used for initial detection of the signal, automatic gain control, diversity selection, coarse frequency-offset compensation and timing synchronization. The second one enables channel estimation and fine frequency-offset compensation. Both subpreambles are shaped by the raised-cosine window. The preamble structure for HIPERLAN/2 is similar to that for IEEE 802.11a WLANs with the exception that (a) the rectangular window is used instead of the raised-cosine window; and (b) the last short training symbol in HIPERLAN/2 is inverted.

To establish timing synchronization, the receiver detects the end of the first subpreamble. This time reference enables the receiver to locate the time instant in the second subpreamble at which the FFT window for fine frequency-offset compensation begins. To detect the end of the first subpreamble, the receiver can correlate the received signal with the short OFDM symbol. The presence of a correlation peak indicates that the first subpreamble has not passed while the absence of an expected correlation peak is an indication that the current time position is in the second subpreamble.

To detect the various preambles and establish timing the receiver has to perform rapid synchronization, e.g., with a correlator. The specifications recommend, though not mandate, a sampling rate of 20 MHz in the digital implementation of the correlator. When a signal arrives at a receiver in IEEE 802.11a WLANs or HIPERLAN/2, the received signal is filtered and downconverted to the baseband frequency. The baseband signal contains two components: the in-phase and quadrature-phase components. The two components are digitized by one or more analog-to-digital converters with a sampling rate set at 20 MHz. Often these two components are represented by a single quantity that is a complex number, wherein the real and imaginary parts of the complex number are the in-phase and quadrature-phase components, respectively.

A sliding correlator is used to process the received signal samples, and generates outputs at a rate of 20 MHz. Since typically 16 complex multiplications are involved in the generation of one correlator output $\Xi_n$, and since the correlator outputs are preferably generated at a rate of 20 MHz, it follows that the correlator needs to perform 320 million complex multiplications per second. Not surprisingly, the implementation of the sliding correlator is very complex in view of the demanding number of involved multiplications, which are further described next.

For instance, if $r_n$ be the nth complex-valued received signal sample after downconversion and digitization, then the nth correlator output, $\Xi_n$, is given by $$\Xi_n = \sum_{m=1}^{16} r_{n-16+m} h_m$$

wherein the sequence of correlator coefficients $h_m$'s constitutes the waveform of a short OFDM symbol. Note that $\Xi_n$ comprises the real and imaginary parts. According to the IEEE 802.11a specification and the HIPERLAN/2 specification, the (complex-valued) waveform of a short OFDM symbol, s(t), is given by $$s(t) = \sum_{k=-26}^{26} S_k e^{i2\pi k \Delta_f t}$$

wherein $D_f$=312.5 kHz, and $S_{-26:26}=\sqrt{13/6}\{0, 0, 1+i, 0, 0, 0, -1-i, 0, 0, 0, 0, 0, 0, -1-i, 0, 0, 0, -1-i, 0, 0, 0, 1+i, 0, 0, 0, 0, 0, 0, 0, -1-i, 0, 0, 0, -1-i, 0, 0, 0, 1+i, 0, 0, 0, 1+i, 0, 0, 0, 1+i, 0, 0, 0, 1+i, 0, 0\}$. In the above, i is the square root of −1. A convenient choice of $h_m$ is $h_m=(52)^{-1/2} s(mT_{sam})$ where $T_{sam}$=50 ns, so that $H_{1:16}=\{-1.1755-0.0208i, -0.1196+0.6969i, 1.2670+0.1123i, 0.8165+0.0000i, 1.2670+0.1123i, -0.1196+0.6969i, -1.1755-0.0208i, 0.4082-0.4082i, 0.0208+1.1755i, -0.6969+0.1196i, -0.1123-1.2670i, -0.8165i, -0.1123-1.2670i, -0.6969+0.1196i, 0.0208+1.1755i, 0.4082-0.4082i\}$.

In other signal processing applications, primarily in implementing digital filters, there have been attempts at performing filtering without the need to perform multiplication. However, these strategies are tailored for particular applications and, consequently, are not readily applicable to perform multiplierless correlations in the context of in HIPERLAN/2 or IEEE 802.11a WLANs specifications. Some example attempts in the context of multiplierless realization of filters include: D. E. Borth in U.S. Pat. No. 4,775,851 entitled "Multiplierless decimating low-pass filter for a noise-shaping A/D converter," issued Oct. 4, 1988 and assigned to Motorola, Inc., Schaumburg, Ill.; A. Miron and D. Koo in U.S. Pat. No. 4,791,597 entitled "Multiplierless FIR digital filter with two to the Nth power coefficients," issued Dec. 13, 1988 and assigned to North American Philips Corporation, New York, N.Y.; K. Lin in U.S. Pat. No. 5,287,299 entitled "Method and apparatus for implementing a digital filter employing coefficients expressed as sums of 2 to an integer power," issued Feb. 15, 1994 and assigned to Monolith Technologies Corporation, Tucson, Ariz.; and D. Lipka in U.S. Pat. No. 6,202,074 entitled "Multiplierless digital filtering," issued Mar. 13, 2001 and assigned to Telefonaktiebolaget LM Ericsson, Stockholm, SE.

The aforementioned attempts at realizing multiplierless filters do not teach or suggest fast sliding correlators implementions suitable for in HIPERLAN/2 or IEEE 802.11a WLANs compliant applications.

SUMMARY OF THE INVENTION

The disclosed invention provide methods and apparatus for correlating the received signal with the waveform of a short OFDM symbol in a HIPERLAN/2 or an IEEE 802.11a WLAN. These methods and apparatus include designs for sliding correlators that can operate in real-time. Moreover, these methods and apparatus greatly reduce the complexity in implementing sliding correlators by reducing the complexity of multiplication operations required by HIPERLAN/2 or IEEE 802.11a WLANs compliant applications. Disclosed sliding correlators preferably produce correlation results at about the rate of incoming signal samples and allow the receiver to perform rapid synchronization.

In particular, alternative correlators are disclosed that can be implemented with inverters, adders, and shift registers to output correlation results at a high rate. These alternative correlators are based on selecting terms from the set consisting of $\{-1, -1+2^{-n}, -1+2 \times 2^{-n}, -1+3 \times 2^{-n}, \ldots, 1\}$ in designing various embodiments that include three example designs that are disclosed to illustrate the underlying teachings with the help of the figures described next.

DETAILED DESCRIPTION OF THE INVENTION

Figure 1:
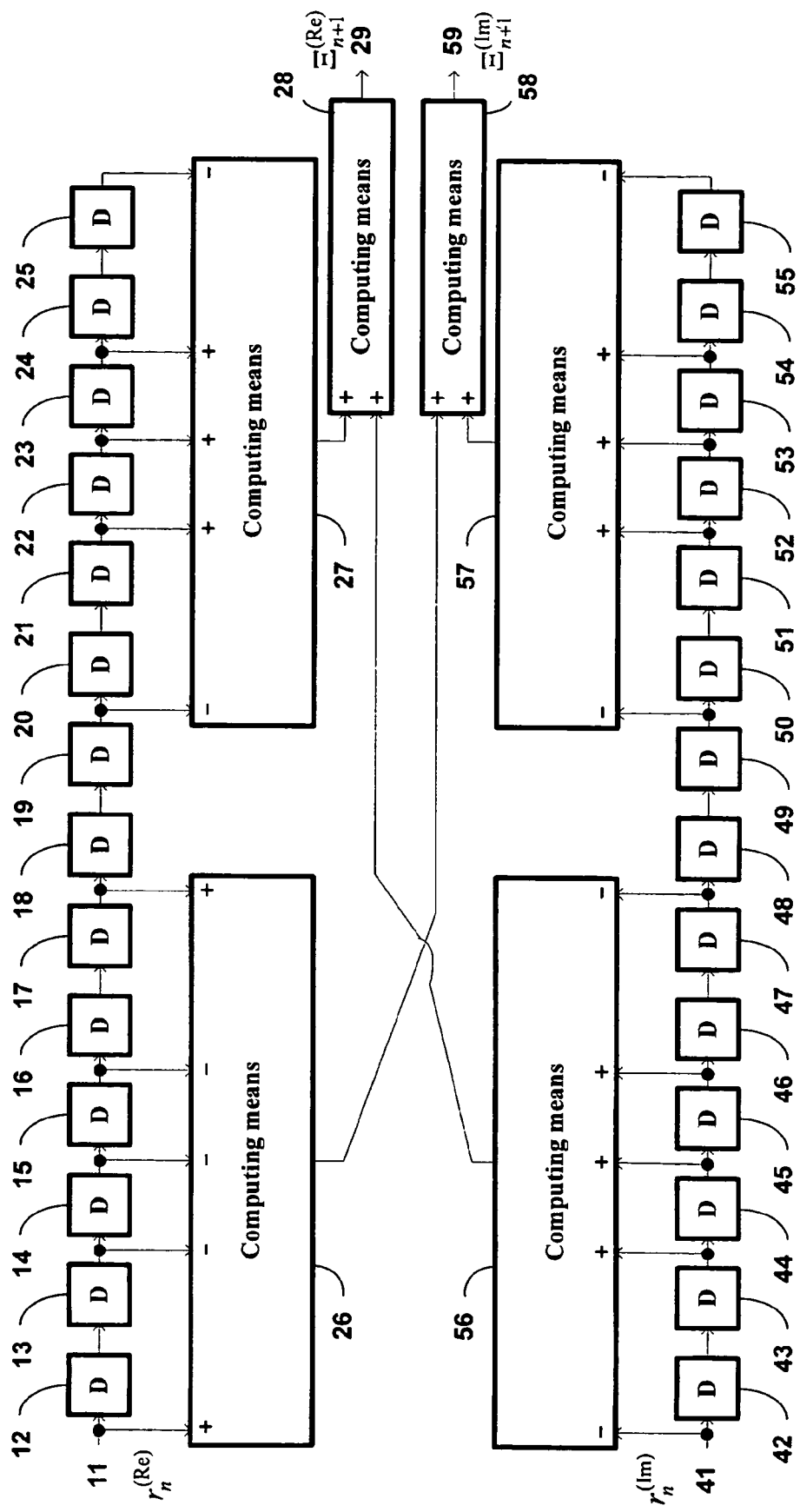
FIG. 1 is an example design for a correlator based on inverters and adders that does not carry out multiplication operations.

The disclosed method and system facilitate implementation of multiplierless correlators that comply with the requirements of the HIPERLAN/2 or IEEE 802.11a WLANs compliant applications. The disclosed mulitplierless correlators reduce the computational overoverhead due to the very large number of multiplications operations that are otherwise required for such compliance. The method and system are further illustrated with the aid of the accompanying FIGURES.

For convenience, but not as a limitation on the scope of the invention, let $\Xi_n^{(Re)} = Re(\Xi_n)$, $\Xi_n^{(Im)} = Im(\Xi_n)$, $r_n^{(Re)} = Re(r_n)$ and $r_n^{(Im)} = Im(r_n)$. Note that $\Xi_n$ can be generated by generating $\Xi_n^{(Re)}$ and $\Xi_n^{(Im)}$ based on $\{r_n^{(Re)}\}$ and $\{r_n^{(Im)}\}$. Then in a method for correlating a signal compliant with IEEE 802.11a WLANs or HIPERLAN/2 specifications, a sequence of alternative correlator coefficients associated with specified non-negative integer n, are employed.

Sampling the signal corresponding to, for instance, the in-phase component generates a plurality of real signal samples at the sampling rate. Similarly, in quadrature phase shift keying the quadrature phase component aids in the generation of a plurality of imaginary signal samples. Together these constitute a complex valued signal.

Each of the real and imaginary signals so generated is advantageously processed while being fed into a shift register having storage locations. The preferred use of shift registers as the means for handling the signal stream is also not intended to be a limitation of the scope of the invention. As the new signal samples are generated, computations are carried out on the signal samples progressively shifted through the shift register to generate correlator values in real time as is further explained next.

The general method to generate $\Xi_n$ without the need to perform multiplication is to employ a sequence of correlator coefficients other than $h_{1:16}$, wherein real parts and imaginary parts of alternative correlator coefficients are chosen from the series comprising $\{-1, -1+2^{-n}, -1+2 \times 2^{-n}, -1+3 \times 2^{-n}, \ldots, 1\}$, in which n is a non-negative integer.

Since real and imaginary parts of received signal samples are represented in binary notation, scaling a binary number by a factor of $k \times 2^{-n}$, k being a non-negative integer, can be efficiently accomplished by n shifting and/or k addition operations. In particular, if said n is chosen from 0, 1, or 2, the implementation complexity of the correlator can be kept small.

As the signal samples move through the shift registor or other topology for storage locations for the signal samples, they are sampled and scaled in accordance with selected correlator coefficients to generate a plurality of scaled real signal samples. These scaling factors are selected as disclosed by the invention to ensure that multiplication operations can be eliminated by using scaling factors that can be implemented by fast circuit elements such as adders, inverters (scaling factor of $-1$), shift registers (for multiplying or dividing by a power of 2), or even not sampling a particular signal sample (for instance to implement scaling by a scaling factor equal to zero).

The scaled signal samples are generated in real time in view of the simple clock-driven circuit elements possible, and then combined in an adder, in accordance with a specified correlator form. This correlator form, in effect, completes the replacement of the correlators described in the IEEE 802.11a WLANs or HIPERLAN/2 specifications by alternative correlators that are friendly to digital implementation. In general, a first subset of the plurality of scaled real signal samples and a second subset of the plurality of scaled imaginary signal samples are added to generate a correlator output. The general expression for $\Xi_n$ is:

$$\Xi_n = \sum_{m=1}^{16} r_{n-16+m} a_m,$$

wherein $a_{1:16}$ are alternative correlators for the complex (real and imaginary) signal samples. These alternative correlators, for instance, in the correlator set $\{-1, 0, 1, 1, 1, 0, -1, 0, 1, 0, -i, -i, -i, 0, i, 0\}$ corresponding to n=0 in the series $\{-1, -1+2^{-n}, -1+2 \times 2^{-n}, -1+3 \times 2^{-n}, \ldots, 1\}$, do not require complex implementation due to the need to handle arbitrary real or complex weights/scaling factors. Expanding the equation with the use of n=0 gives the correlator forms $$\Xi_n^{(Re)} = -r_{n-15}^{(Re)} + r_{n-13}^{(Re)} + r_{n-12}^{(Re)} + r_{n-11}^{(Re)} - r_{n-9}^{(Re)} - r_{n-7}^{(Im)} + r_{n-5}^{(Im)} + r_{n-4}^{(Im)} + r_{n-3}^{(Im)} - r_{n-1}^{(Im)}$$

and $$\Xi_n^{(Im)} = -r_{n-15}^{(Im)} + r_{n-13}^{(Im)} + r_{n-12}^{(Im)} + r_{n-11}^{(Im)} - r_{n-9}^{(Im)} + r_{n-7}^{(Re)} - r_{n-5}^{(Re)} - r_{n-4}^{(Re)} - r_{n-3}^{(Re)} + r_{n-1}^{(Re)}.$$

Notably the first five coefficients in each of the correlator forms are related to the last five coefficients by a change in sign. This symmetry further simplifies the illustrative implementations described next. These correlator forms may be evaluated without employing multipliers since only additions are required with scaling accomplished by merely taking the negative of a value in the course of generating both $\Xi_n^{(Re)}$ and $\mu_n^{(Im)}$. Therefore, the value of $\Xi_n$ can be computed entirely by addition and subtraction. Alternatively, $\Xi_n$ can be generated by delaying $\Xi_{n+1}$ by one sampling interval, wherein $\Xi_{n+1}$ can be obtained by computing $$\Xi_{n+1}^{(Re)} = \text{Re}(\Xi_{n+1}) \text{ and } \Xi_{n+1}^{(Im)} = \text{Im}(\Xi_{n+1}),$$

given by correlator forms $$\Xi_{n+1}^{(Re)} = -r_{n-14}^{(Re)} + r_{n-12}^{(Re)} + r_{n-11}^{(Re)} + r_{n-10}^{(Re)} - r_{n-8}^{(Re)} - r_{n-6}^{(Im)} + r_{n-4}^{(Im)} + r_{n-3}^{(Im)} + r_{n-2}^{(Im)} - r_n^{(Im)}$$

and $$\Xi_{n+1}^{(Im)} = -r_{n-14}^{(Im)} + r_{n-12}^{(Im)} + r_{n-11}^{(Im)} + r_{n-10}^{(Im)} - r_{n-8}^{(Im)} + r_{n-6}^{(Re)} - r_{n-4}^{(Re)} - r_{n-3}^{(Re)} - r_{n-2}^{(Re)} + r_n^{(Re)}.$$

An example apparatus for generating $\Xi_{n+1}$ in accordance with this expression is shown in FIG. 1. In FIG. 1 a plurality of storage locations 12-25, collectively acting as a shift register, store received signal samples $\{r_n^{(Re)}\}$. These storage locations or storage means are preferably implemented as storage registers or latches although alternative designs are possible. From the stored signal samples, samples are fed into a computation unit that can receive five inputs for the five non-zero signal samples. In this particular case, two of the samples have negative signs which can be implemented for a binary number, in the context of generating an input for an adder, by taking the complement and adding 1, while ignoring the overall carry.

The computation unit may be implemented, for instance, as a binary adder with suitable inverters, or a programmable computational unit, and the like for real-time processing of the signal samples in the shift registers. Preferably, the processing is fast enough, i.e., corresponds to the same clock that controls the sampling of the signal, although alternative implementations may allow for slower or faster processing.

Thus, the 5-input-1-output computing means 26, 27 provides an output based on the contents stored in storage locations 12-25 and the signal sample detected at input port 11. Similarly, a plurality of storage locations 42-55 collectively acting as a shift register receive signal samples $\{r_n^{(Im)}\}$ (stored in storage means 42-55 and the signal sample detected at input port 41), which are processed by 5-input-1-output computing means 56, 57.

A 2-input-1-output computing means 28, for instance, implemented as a binary adder, computes $$\{\Xi_{n+1}^{(Re)}\}$$

from the outputs of computing means 27 and 56. Similarly, another 2-input-1-output computing means 58 computes $$\{\Xi_{n+1}^{(Im)}\}$$

from the outputs of computing means 26 and 57. It should be noted that the various computing means depicted in FIG. 1 may, with no loss in generality, combine the scaling and adding operations. Therefore, the detailed description herein is to aid understanding rather than depict the illustrative embodiments as limitations.

The operation of the illustrative apparatus of FIG. 1 may be further explained as follows. The incoming sample $r_n^{(Re)}$ is fed to the input of storage locations 12 through input port 11. The samples $$r_{n-1}^{(Re)}, r_{n-2}^{(Re)}, \ldots, r_{n-14}^{(Re)}$$

are contents of storage locations 12, 13, ..., 25, respectively. Similarly, the incoming sample $r_n^{(Im)}$ is fed to the input of storage locations 42 through input port 41 and the samples $$r_{n-1}^{(Im)}, r_{n-2}^{(Im)}, \ldots, r_{n-14}^{(Im)}$$

are contents of storage locations 42, 43, ..., 55, respectively.

Computing means 26, perform addition operations and subtraction operations (equivalent to addition following scaling by −1) on real signal samples detected at input port 11 and the storage locations 13-15, 17 to generate an output. Specifically, computing means 26, in accordance with the correlator forms for n=0 adds the content of storage locations 17 and input port 11 and from this sum subtracts the sum of contents of storage locations 13-15. Computing means 27 similarly processes the contents of storage locations 19, 21-23, and 25 by summing contents of storage locations 21-23 and from this sum subtracting the sum of contents of storage locations 19 and 25. Computing means 56, processes the signal samples input port 41 and the contents of storage locations 43-45, 47 by summing contents of storage locations 43-45 and from this sum subtracting the signal samples at storage locations 47 and at input port 41. Computing means 57 processes the contents of storage locations 49, 51-53, 55 by the summing contents of storage locations 51-53 and subtracting the sum of contents of storage locations 49 and 55.

Next, computing means 28 adds the outputs of computing means 27 and 56 to yield $$\Xi_{n+1}^{(Re)},$$

which is optionally available at port 29. Similarly, computing means 58 performs addition on the outputs of computing means 26 and 57 to yield $$\Xi_{n+1}^{(Im)},$$

which is optionally available at port 59.

The use of n=1 gives the additional correlator forms:

$$\Xi_n = \sum_{m=1}^{16} r_{n-16+m} b_m,$$

Alternative correlators $b_{1:16}=\{-0.5, 0.5i, 1, 0.5, 1, 0.5i, -0.5, 0, 0.5i, -0.5, -i, -0.5i, -i, -0.5, 0.5i, 0\}$ correspond to n=1 in the series $\{-1, -1+2^{-n}, -1+2\times 2^{-n}, -1+3\times 2^{-n}, \ldots, 1\}$ and are also useful for processing complex signal samples. Expanding the equation gives $$\Xi_n^{(Re)} = -\frac{1}{2}r_{n-15}^{(Re)} + r_{n-13}^{(Re)} + \frac{1}{2}r_{n-12}^{(Re)} + r_{n-11}^{(Re)} - \frac{1}{2}r_{n-9}^{(Re)} - \frac{1}{2}r_{n-6}^{(Re)} - \frac{1}{2}r_{n-2}^{(Re)} - \frac{1}{2}r_{n-14}^{(Im)} - \frac{1}{2}r_{n-10}^{(Im)} - \frac{1}{2}r_{n-7}^{(Im)} + r_{n-5}^{(Im)} + \frac{1}{2}r_{n-4}^{(Im)} + r_{n-3}^{(Im)} - \frac{1}{2}r_{n-1}^{(Im)}$$

and $$\Xi_n^{(Im)} = \frac{1}{2}r_{n-14}^{(Re)} + \frac{1}{2}r_{n-10}^{(Re)} + \frac{1}{2}r_{n-7}^{(Re)} - r_{n-5}^{(Re)} - \frac{1}{2}r_{n-4}^{(Re)} - r_{n-3}^{(Re)} + \frac{1}{2}r_{n-1}^{(Re)} - \frac{1}{2}r_{n-15}^{(Im)} + r_{n-13}^{(Im)} + \frac{1}{2}r_{n-12}^{(Im)} + r_{n-11}^{(Im)} - \frac{1}{2}r_{n-9}^{(Im)} - \frac{1}{2}r_{n-6}^{(Im)} - \frac{1}{2}r_{n-2}^{(Im)}.$$

Since the signal samples are represented in binary notation, scaling a binary number by a factor of 0.5 can be efficiently accomplished by shifting said binary number for one bit position. Therefore, multiplication is eliminated in the generation of $$\Xi_n^{(Re)} \text{ and } \Xi_n^{(Im)}.$$

The value of $\Xi_n$ can be computed entirely by addition, subtraction and shifting operations that consume fewer clock cycles than complex multiplications. Alternatively, $\Xi_n$ can be generated by delaying $\Xi_{n+1}$ for a duration of one sampling interval, wherein $\Xi_{n+1}$ can be obtained by computing $$\Xi_{n+1}^{(Re)} = \mathrm{Re}\,(\Xi_{n+1}) \text{ and } \Xi_{n+1}^{(Im)} = \mathrm{Im}\,(\Xi_{n+1}),$$

given by $$\Xi_{n+1}^{(Re)} = -\frac{1}{2}r_{n-14}^{(Re)} + r_{n-12}^{(Re)} + \frac{1}{2}r_{n-11}^{(Re)} + r_{n-10}^{(Re)} - \frac{1}{2}r_{n-8}^{(Re)} - \frac{1}{2}r_{n-5}^{(Re)} - \frac{1}{2}r_{n-1}^{(Re)} - \frac{1}{2}r_{n-13}^{(Im)} - \frac{1}{2}r_{n-9}^{(Im)} - \frac{1}{2}r_{n-6}^{(Im)} + r_{n-4}^{(Im)} + \frac{1}{2}r_{n-3}^{(Im)} + r_{n-2}^{(Im)} - \frac{1}{2}r_{n}^{(Im)}$$

and $$\Xi_{n+1}^{(Im)} = \frac{1}{2}r_{n-13}^{(Re)} + \frac{1}{2}r_{n-9}^{(Re)} + \frac{1}{2}r_{n-6}^{(Re)} - r_{n-4}^{(Re)} - \frac{1}{2}r_{n-3}^{(Re)} - r_{n-2}^{(Re)} + \frac{1}{2}r_{n}^{(Re)} - \frac{1}{2}r_{n-14}^{(Im)} + r_{n-12}^{(Im)} + \frac{1}{2}r_{n-11}^{(Im)} + r_{n-10}^{(Im)} - \frac{1}{2}r_{n-8}^{(Im)} - \frac{1}{2}r_{n-5}^{(Im)} - \frac{1}{2}r_{n-1}^{(Im)}.$$

Figure 2:
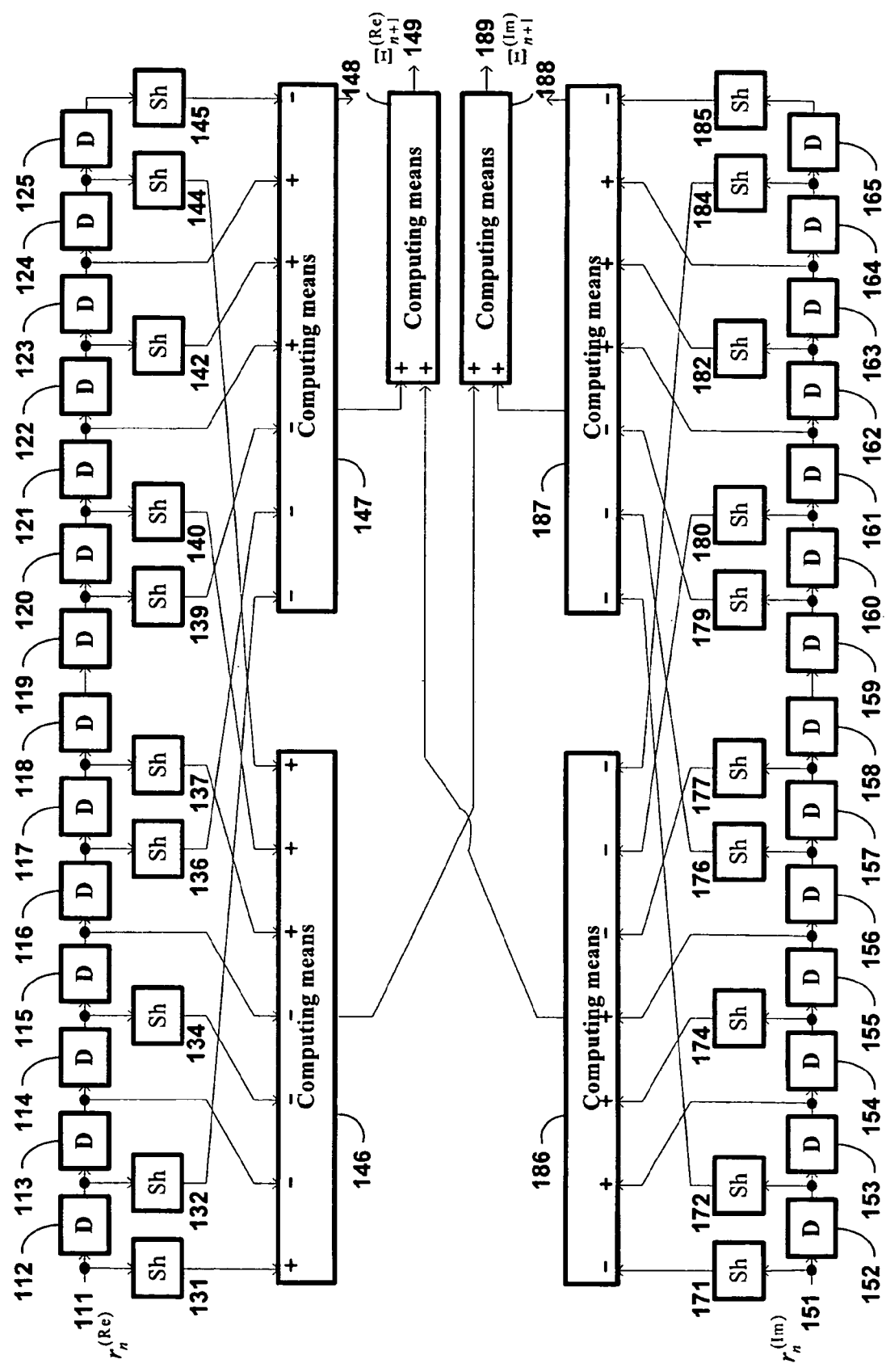
FIG. 2 is another example design for a correlator based on shift registers, inverters and adders that does not carry out multiplication operations.

An example apparatus for generating $\Xi_{n+1}$ in accordance with the expression above is shown in FIG. 2. In FIG. 2, as in the case of FIG. 1, a plurality of storage locations 112-125 collectively act as a shift register for storing received signal samples $\{r_n^{(Re)}\}$. In addition, shifting means 131, 132, 134, 136, 137, 139, 140, 142, 144, 145 for shifting the input by one bit position perform scaling by a factor of one half. Suitably scaled signal samples are processed first in 7-input-1-output computing means 146, 147, a design taking advantage of the symmetry in the coefficients in the expression above in a manner similar to the design in FIG. 1. For the other signal sample stream, a plurality of storage locations 152-165 collectively act as a shift register for storing received signal samples $\{r_n^{(Im)}\}$ with shifting means 171, 172, 174, 176, 177, 179, 180, 182, 184, 185 scaling by a factor of one half as required. Another 7-input-1-output computing means 186, 187, in a manner similar to computing means 146, 147, process the stored signal samples. 2-input-1-output computing means 148 computes values of $$\{\Xi_{n+1}^{(Re)}\}$$

based on the outputs of computing means 147, 186, and 2-input-1-output computing means 188 for computing values of $$\{\Xi_{n+1}^{(Im)}\}$$

based on the outputs of computing means 146, 187.

The operation of the illustrative apparatus of FIG. 2 may be further explained as follows. For complex valued signals a real and imaginary signal stream is implemented. The incoming signal samples $r_n^{(Re)}$ are fed to the input of storage locations 112 through input port 111 resulting in the samples $$r_{n-1}^{(Re)}, r_{n-2}^{(Re)}, \ldots, r_{n-14}^{(Re)}$$

being contents of storage locations 112, 113, . . . , 125, respectively. Similarly, the incoming samples $$r_{n-1}^{(Im)}, r_{n-2}^{(Im)}, \ldots, r_{n-14}^{(Im)}$$

in the imaginary stream are stored in storage locations 152, 153, . . . , 165, respectively. Shifting means 131 shifts the signal sample at input port 111 by one bit position to scaling by a factor of 0.5. Similarly, shifting means 132, 134, 136, 137, 139, 140, 142, 144, 145, shift the signal samples in storage locations 112, 114, 116, 117, 119, 120, 122, 124, 125 respectively by one bit position to scaling them by a factor of 0.5.

Computing means 146, then, sum the outputs of storage/shifting means 131, 137, 140, 144 followed by subtracting the sum of outputs of storage/shifting means 113, 134, 115. Similarly, computing means 147 sum of outputs of storage/shifting means 121, 142, 123 and subtract the sum of outputs of storage/shifting means 132, 136, 139, 145.

In the other stream, in a similar manner, shifting means 171 shifts the signal sample at input port 151 to scale it by a factor of 0.5 while shifting means 172, 174, 176, 177, 179, 180, 182, 184, 185 shift the outputs in storage locations 152, 154, 156, 157, 159, 160, 162, 164, 165 respectively by one bit position to scale them by a factor of 0.5.

Computing means 186 sum the outputs of storage/shifting means 153, 174, 155 and subtract the sum of outputs of storage/shifting means 171, 177, 180, 184, while computing means 187, sum the outputs of storage/shifting means 161, 182, 163 and subtract the sum of outputs of storage/shifting means 172, 176, 179, 185. Next, computing means 148 add the outputs of computing means 147, 186 to generate $$\Xi_{n+1}^{(Re)},$$

which is optionally available at port 149. Computing means 188 add the outputs of computing means 146, 187 to generate $$\Xi_{n+1}^{(Im)},$$

which is optionally available at port 189.

Another correlator form is possible for n=2. This embodiment may be represented by:

$$\Xi_n = \sum_{m=1}^{16} r_{n-16+m} c_m,$$

Alternative correlators $c_{1:16}=\{-0.5, 0.5i, 1, 0.5, 1, 0.5i, -0.5, 0.5-0.5i, 0.5i, -0.5, -i, -0.5i, -i, -0.5, 0.5i, 0, 5-0.5i\}$ correspond to n=2 in the series $\{-1, -1+2^{-n}, -1+2\times 2^{-n}, -1+3\times 2^{-n}, \ldots, 1\}$ and are also useful for processing complex signal samples. Expanding this equation leads to correlator forms that are related in their respective coefficients:

$$\Xi_n^{(Re)} = -\frac{1}{2}r_{n-15}^{(Re)} + r_{n-13}^{(Re)} + \frac{1}{2}r_{n-12}^{(Re)} + r_{n-11}^{(Re)} - \frac{1}{2}r_{n-9}^{(Re)} +$$
$$\frac{1}{2}r_{n-8}^{(Re)} - \frac{1}{2}r_{n-6}^{(Re)} - \frac{1}{2}r_{n-2}^{(Re)} + \frac{1}{2}r_n^{(Re)} - \frac{1}{2}r_{n-14}^{(Im)} - \frac{1}{2}r_{n-10}^{(Im)} +$$
$$\frac{1}{2}r_{n-8}^{(Im)} - \frac{1}{2}r_{n-7}^{(Im)} + r_{n-5}^{(Im)} + \frac{1}{2}r_{n-4}^{(Im)} + r_{n-3}^{(Im)} - \frac{1}{2}r_{n-1}^{(Im)} + \frac{1}{2}r_n^{(Im)}$$

and $$\Xi_n^{(Im)} = \frac{1}{2}r_{n-14}^{(Re)} + \frac{1}{2}r_{n-10}^{(Re)} - \frac{1}{2}r_{n-8}^{(Re)} + \frac{1}{2}r_{n-7}^{(Re)} - r_{n-5}^{(Re)} -$$
$$\frac{1}{2}r_{n-4}^{(Re)} - r_{n-3}^{(Re)} + \frac{1}{2}r_{n-1}^{(Re)} - \frac{1}{2}r_n^{(Re)} - \frac{1}{2}r_{n-15}^{(Im)} + r_{n-13}^{(Im)} +$$
$$\frac{1}{2}r_{n-12}^{(Im)} + r_{n-11}^{(Im)} - \frac{1}{2}r_{n-9}^{(Im)} + \frac{1}{2}r_{n-8}^{(Im)} - \frac{1}{2}r_{n-6}^{(Im)} - \frac{1}{2}r_{n-2}^{(Im)} + \frac{1}{2}r_n^{(Im)}.$$

Figure 3:
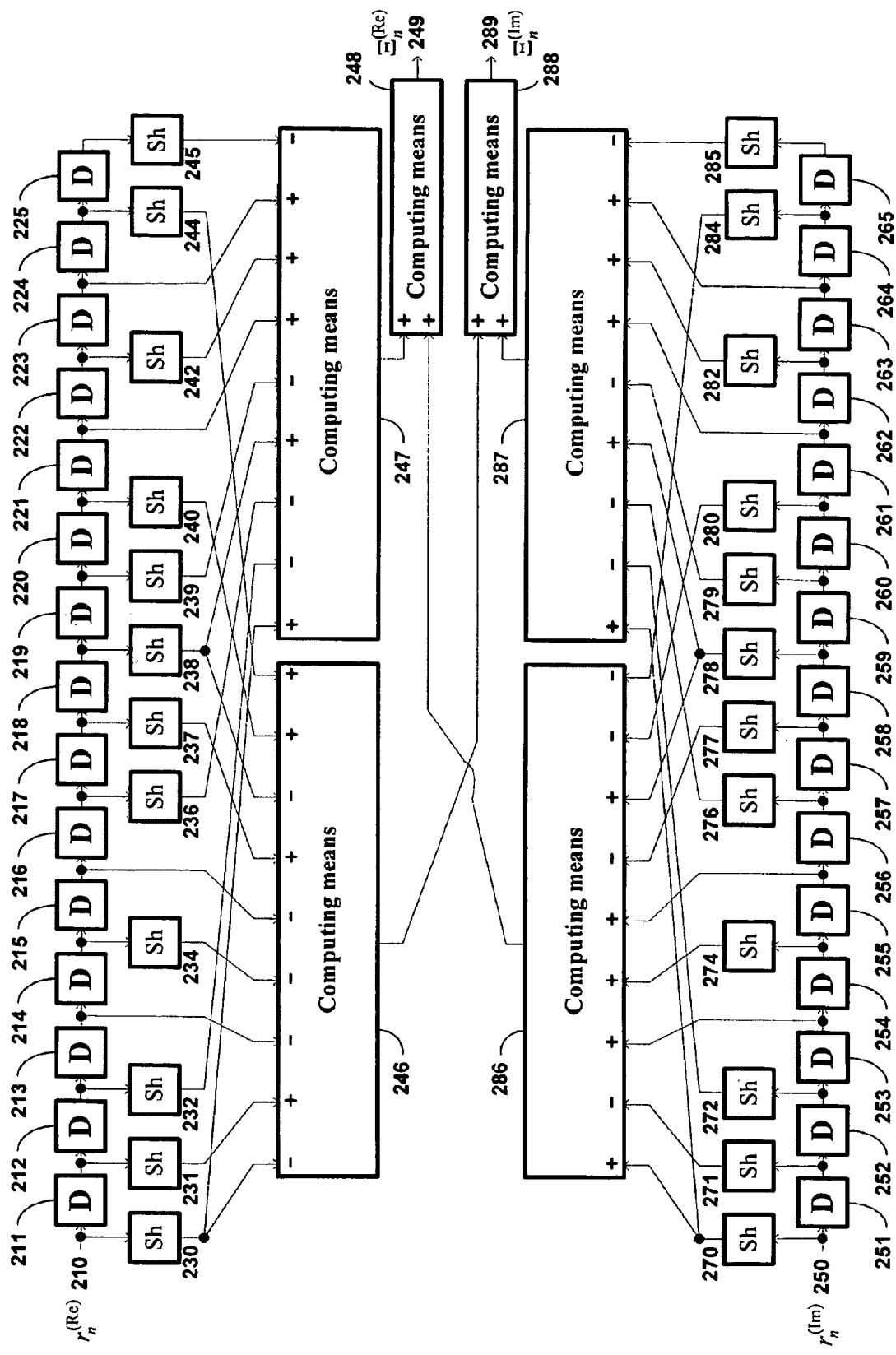
FIG. 3 is yet another example design for a multiplierless correlator.

As in the case of FIG. 2, in the generation of $\Xi_n^{(Re)}$ and $\Xi_n^{(Im)}$, multiplication may be eliminated with the value of $\Xi_n$ computed entirely by addition, subtraction and shifting operations. An illustrative, but not the only possible, implementation of the alternative correlator $\Xi_n$ (shown above) is shown in FIG. 3.

A plurality of storage locations 211-125 collectively act as a shift register for storing received signal samples $\{r_n^{(Re)}\}$. In addition, shifting means 230, 231, 232, 234, 236, 237, 238, 239, 240, 242, 244, 245 scale the input by a factor of one half as shown followed by processing by 9-input-1-output computing means 246 or 247 as shown. For another signal sample stream, a plurality of storage locations 251-265 collectively act as a shift register for storing received signal samples $\{r_n^{(Im)}\}$. Shifting means 270, 271, 272, 274, 276, 277, 278, 279, 280, 282, 284, 285 scaling this stored input as required by a factor of one half followed by processing by 9-input-1-output computing means 286 or 287.

2-input-1-output computing means 248 computing $\{\Xi_n^{(Re)}\}$ from the outputs of computing means 247 and 286, and 2-input-1-output computing means 288 compute $\{\Xi_n^{(Im)}\}$ from the outputs of computing means 246 and 287. The operation of said apparatus is similar to that described for FIG. 2 except for the implementation of different alternative correlators. The incoming sample $r_n^{(Re)}$ is fed to the input of storage locations 211 through input port 210, while $r_n^{(Im)}$ is fed to the input of storage locations 251 through input port 250. The samples $$r_{n-1}^{(Re)}, r_{n-2}^{(Re)}, \ldots, r_{n-15}^{(Re)}$$

are contents of storage locations 211, 212, . . . , 225, respectively and the samples $$r_{n-1}^{(Im)}, r_{n-2}^{(Im)}, \ldots, r_{n-15}^{(Im)}$$

are contents of storage locations 251, 252, . . . , 265, respectively. Shifting means 230 shifts the value appeared at input port 210 by one bit position while shifting means 270 shifts the value appeared at input port 150 to scale them by a factor of 0.5. Shifting means 231, 232, 234, 236, 237, 238, 239, 240, 242, 244, 245, 271, 272, 274, 276, 277, 278, 279, 280, 282, 284, and 285, shift the outputs in storage locations 211, 212, 214, 216, 217, 218, 219, 220, 222, 224, 225, 251, 252, 254, 256, 257, 258, 259, 260, 262, 264, and 265 respectively by one bit position to scale by a factor of 0.5. Computing means 246 sum the outputs of storage/shifting means 231, 237, 240, 244 and subtract therefrom the sum of outputs of storage/shifting means 230, 213, 234, 215, 238. Computing means 247 sum the outputs of storage/shifting means 230, 238, 221, 242, 223 and subtract therefrom the sum of outputs of storage/shifting means 232, 236, 239, 245. Computing means 286 sum the outputs of storage/shifting means 270, 253, 274, 255, 278 and subtract therefrom the sum of outputs of storage/shifting means 271, 277, 280, 284, while computing means 287 sum of outputs of storage/shifting means 270, 278, 261, 282, 263 and subtract therefrom the sum of outputs of storage/shifting means 272, 276, 279, 285.

Next, computing means 248 add the outputs of computing means 247 and 286 to generate $\Xi_n^{(Re)}$, which is optionally available at port 249. Similarly, computing means 288 add the outputs of computing means 246 and 287 to generate $\Xi_n^{(Im)}$, which is optionally available at port 289.

As may be noted, and indicated herein, the disclosed invention is susceptible to many variations and alternative implementations without departing from its teachings or spirit. Such modifications are intended to be within the scope of the claims appended below. For instance, one can scale all the correlator coefficients by the same constant other than zero in the implementation of the apparatus described herein. Therefore, the claims must be read to cover such modifications and variations and their equivalents. Moreover, all references cited herein are incorporated by reference in their entirety for their disclosure and teachings.

We claim:

1. A method for correlating an input signal with a sequence of alternative correlator coefficients, an alternative sequence associated with a specified non-negative integer n, the method comprising:
   digitally sampling the input signal to generate a plurality of real signal digital samples and a plurality of imaginary signal digital samples, wherein the input signal is compliant with at least one specification selected from IEEE 802.11a WLANs or HIPERLAN/2;
   scaling the plurality of real signal digital samples in accordance with a selected sequence of alternative correlator coefficients to generate a plurality of scaled real signal samples;
   scaling the plurality of imaginary signal digital samples in accordance with the selected sequence of alternative correlator coefficients to generate a plurality of scaled imaginary signal samples; and
   combining, in accordance with a specified correlator form, a first subset of the plurality of scaled real signal samples and a second subset of the plurality of scaled imaginary signal samples to generate at least one correlator output signal.

2. The method of claim 1 wherein a correlator coefficient value of 0 for a digital sample is implemented in the scaling of the plurality of imaginary samples by not using the digital sample in the combining of the first and second subsets.

3. The method of claim 1 wherein a -1 correlator coefficient value for a digital sample is implemented in the scaling of the plurality of imaginary samples by inverting the digital sample in the combining of the first and second subsets.

4. The method of claim 1 wherein a correlator coefficient value of 0.5 for a digital sample is implemented in the scaling of the plurality of imaginary samples by shifting the digital sample in a shift register prior to the combining of the first and second subsets.

5. The method of claim 1 wherein imaginary and real signal digital samples are handled in separate data streams prior to the combining of the first and second subsets.

6. The method of claim 1 wherein a digital sample is detected at a storage location.

7. The method of claim 1 wherein one or more of a first plurality of storage locations, having at least one real signal digital sample, and a second plurality of storage locations, having at least one imaginary signal digital sample, are connected together as a shift register.

8. The method of claim 1 wherein the sequence of alternative correlator coefficients comprise members of the group consisting of $\{-1, -1+2^{-n}, -1+2\times2^{-n}-1+3\times2, \ldots, 1\}$.

9. The method of claim 1 wherein the specified correlator form comprises $$\Xi_n = \sum_{m=1}^{16} r_{n-16+m} a_m$$

wherein furthermore $a_m$ is the scaling factor for signal sample $r_{n-16+m}$.

10. The method of claim 8, wherein the integer n is chosen from the group consisting of 0,1, or 2, and n selects the sequence of alternative correlator coefficients.

11. The method of claim 1 wherein the sampling is applied to an in-phase part of a baseband signal to generate the plurality of real signal digital samples.

12. The method of claim 1 wherein the sampling is applied to a quadrature-phase part of a baseband signal to generate the plurality of imaginary signal digital samples.

13. An apparatus to generate a correlation signal from a plurality of streams of input signal samples, the apparatus comprising:
   at least one digital signal processor, to performs all of the operations from the group consisting of bitwise scaling, addition, time-wise shifting, or inversion on one or more of two streams from the plurality of streams and on a current value of a sample from the plurality of streams of samples; and
   an adder to add outputs signals of the processor to generate a first correlation signal wherein a processor bitwise scaling operation depends on a set of correlator values that generate the first correlation signal compliant with HIPERLAN/2 or IEEE 802.11a WLAN specifications.

14. The apparatus of claim 13, further comprising a shift register to store samples from a stream in the plurality of streams as finite-precision numbers.

15. An apparatus as set forth in claim 13, wherein furthermore, the adder to receive output signals from two processors, and the processors in turn, are to perform operations on one stream.

16. The apparatus of claim 13, wherein each processor has one output signal and a number of input signals selected from the group consisting of 5, 7 or 9.

17. The apparatus of claim 13, wherein the set of correlator values is selected from a group of sets consisting of {-1, 0,1,1,1, 0, -1, 0, i, 0, -i, -i, -i, 0, i, 0}, {-0.5, 0.5i, 1, 0.5, 1, 0.5i, -0.5,0, 0.5i, -0.5, -i, -0.5i, -i, -0.5, 0.5i, 0}, or{-0.5, 0.5i, 1, 0.5,1, 0.5i, -0.5, 0.5-0.5i, 0.5i, -0.5, -i, -0.5i, -i, -0.5, 0.5i, 0.5-0.5i}.

18. A method for correlating a complex-valued received signal samples with a 16-point waveform, to produce a complex-valued correlation result signal, the method comprising:
   selecting a 16-point waveform representation from the group consisting of waveform representation {-1, 0,1,1, 1, 0, -1, 0,-I, 1,1, 0, 0}, waveform representation {0.5, 0.5i, 1, 0.5i, 1, 0.5i, -0.5, 0, 0.5i, -0.5, -I, -0.5i, -I, -0.5, 0.5i,0}, or waveform representation {0.5, 0.5i, 1,0.5,1, 0.5i, -0.5, 0.5-0.5i, 0.5i, -0.5, -I, -O.5i, -I, -0.5, 0.5i, 0.5-0.5i};
   splitting a received signal into a plurality of streams;
   storing, in a shift register, signal samples from at least one signal stream;
   scaling, in accordance with a selected 16-point representation, at least one stored signal sample by an operation from the group consisting of inverting or shifting;
   processing, in accordance with a selected 16-point representation, the at least one stored signal sample by adding it to at least one other signal sample from the plurality of streams to produce a first interim output signal; and
   generating the complex valued correlation result signal by combining the first interim output signal with a second interim output signal, wherein the complex valued correlation result signal is compliant with IEEE 802.11a WLANs or HIPERLAN/2.

19. The method of claim 18 wherein the at least one other signal sample is scaled prior to the processing at least one signal sample.

20. A receiver comprising:
- at least one digital signal processor, to performs at least one operation from the group consisting of scaling, addition, shifting, or subtraction on one or more streams from a plurality of streams of samples and on a current value of a stream of samples from the plurality of streams of samples; and
- an adder to add at least one output signal of the processor to generate a first correlation signal compliant with the IEEE 802.11a WLANs or HIPERLAN/2 specifications.

* * * * *